US006826166B2

(12) United States Patent
Yokoyama

(10) Patent No.: US 6,826,166 B2
(45) Date of Patent: Nov. 30, 2004

(54) WIRELESS ACCESS SYSTEM

(75) Inventor: Naoki Yokoyama, Nakano-ku (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 891 days.

(21) Appl. No.: 09/733,884

(22) Filed: Dec. 11, 2000

(65) Prior Publication Data

US 2002/0018455 A1 Feb. 14, 2002

(30) Foreign Application Priority Data

Dec. 10, 1999 (JP) .......................................... P.11-352392

(51) Int. Cl.[7] .............................. H04Q 7/24; G06F 13/00
(52) U.S. Cl. ..................... 370/338; 455/433; 455/435.1; 709/217; 709/225
(58) Field of Search ................................ 370/328, 329, 370/338, 352, 401, 407, 420, 425, 465, 468; 455/422, 432.1, 433, 435.1, 445, 450, 507, 517; 709/201, 203, 217, 218, 219, 223, 225, 238, 249

(56) References Cited

U.S. PATENT DOCUMENTS

| | | | | |
|---|---|---|---|---|
| 6,377,982 B1 | * | 4/2002 | Rai et al. | 709/217 |
| 6,393,482 B1 | * | 5/2002 | Rai et al. | 709/225 |
| 6,421,714 B1 | * | 7/2002 | Rai et al. | 709/217 |
| 6,452,915 B1 | * | 9/2002 | Jorgensen | 370/338 |
| 6,466,571 B1 | * | 10/2002 | Dynarski et al. | 370/352 |
| 6,590,885 B1 | * | 7/2003 | Jorgensen | 370/338 |
| 6,594,246 B1 | * | 7/2003 | Jorgensen | 370/338 |
| 6,615,041 B2 | * | 9/2003 | Adamany et al. | 455/432.1 |
| 6,675,208 B1 | * | 1/2004 | Rai et al. | 709/224 |

FOREIGN PATENT DOCUMENTS

JP          9-130419       *  5/1997

OTHER PUBLICATIONS

Capability of Fast Wireless Access (FWA), Nikkei Communications 1999, pp. 106–112.*

* cited by examiner

Primary Examiner—Alpus H. Hsu
(74) Attorney, Agent, or Firm—Jacobson Holman PLLC

(57) ABSTRACT

There is disclosed a wireless access system in which subscriber registration, deletion, and the like are set in a pertinent wireless base station in accordance with a request from a management center, and remote maintenance is realized. The management center is provided with an SNMP manager, each wireless base station is provided with an SNMP agent, and an SNMP protocol is used to set information of subscriber new registration, registration deletion, operation stop, and operation restart in a subscriber management information table for use in communication permission in accordance with SET request in the wireless access system.

10 Claims, 11 Drawing Sheets

WIRELESS ACCESS SYSTEM

BACKGROUND OF THE INVENTION

1. Field of the Invention

The present invention relates to a wireless access system for utilizing wireless to present a high-speed circuit to a subscriber, and more particularly, it relates to a wireless access system in which management of the subscriber can easily be performed.

2. Description of the Related Art

With an intention of setting up an information communication base for the next generation, nationwide setup of a subscriber system optical fiber network is being promoted aiming at 2010, and with an intention of promoting complementary utilization of the subscriber system optical fiber network and setup of a local network in an early stage, there is a bulging demand for a subscriber wireless access system (Fixed Wireless Access: FWS, hereinafter referred to simply as the wireless access system") for utilizing wireless to present a high-speed circuit to a subscriber.

The wireless access system includes a point-point (P-P) method by communication between buildings for a corporation as an object, and a point-multipoint (P-MP) method for a general house and small-scaled office (small office home office: SOHO) as the object.

The wireless access system of the P-MP method is constituted of one wireless base station and a plurality of subscriber stations interconnected via a wireless circuit.

In general, in the wireless access system of the P-MP method, when one wireless base station performs communication with a plurality of subscriber stations, during wireless communication, the communication is carried out after judging whether or not the subscriber station as a communication object is a subscriber station having subscribed to the wireless access system.

In order to perform authentication control at the wireless base station as described above, it is necessary to hold registration information regarding all the subscribers contained in one wireless base station beforehand in the wireless base station.

Therefore, in the wireless access system, when a new subscriber makes a contract for a new service with a communication agency, it is necessary to store the registration information constituted by a subscriber identifier (subscriber ID), and the like in the wireless base station. When the subscriber cancels the contract with the communication agency, it is necessary to delete the registration information.

Additionally, summary of the subscriber wireless access system is described in Capability of Fast Wireless Access (FWA)", NIKKEI COMMUNICATIONS 1999.9.6. pp. 106 to 112.

Moreover, a network management method is described in Japanese Patent Application Laid-Open No. 130419/1997 titled Network Management Method" laid open on May 16, 1997 (applicant: Hitachi Cable, Ltd., Inventor: Hidetoshi Kashima).

In this invention, all relay apparatuses are connected under a specific relay apparatus, and a management apparatus can execute a management operation with respect to all the relay apparatuses by performing communication via the specific relay apparatus.

As described above, in the aforementioned conventional wireless access system, since the registration information of all the subscribers has to be stored beforehand in the corresponding wireless base station, it is difficult to easily manage subscriber registration, deletion, stop, restart, and the like, and there is a problem that a frequent subscriber situation change cannot be handled particularly when the number of wireless base stations increases.

SUMMARY OF THE INVENTION

An object of the present invention is to provide a wireless access system in which subscriber registration, deletion, and the like are set in a pertinent wireless base station in accordance with a request from a management center and remote maintenance is realized.

According to the present invention, there is provided a wireless access system in which a management center is provided with an SNMP manager, each wireless base station is provided with an SNMP agent, an SNMP protocol is used to set information of subscriber new registration, registration deletion, operation stop, and operation restart in a subscriber management information table for use in communication permission in accordance with an SET request, and subscriber management in each wireless base station can easily be realized on the SET request from the management center.

Moreover, according to the present invention, there is provided a wireless access system in which a management center is provided with an SNMP manager, each wireless base station is provided with an SNMP agent and a subscriber management information table for storing subscriber information, and each wireless base station refers to the subscriber management information table to perform communication with a subscriber station permitted to communicate. The SNMP manager of the management center uses an SNMP protocol to transmit subscriber new registration information to the SNMP agent of the wireless base station in accordance with an SET request of SNMP, and the SNMP agent of the wireless base station checks whether or not a pertinent subscriber is registered in the subscriber management information table on judging that the SET request is subscriber new registration, returns an error to the SNMP manager of the management center when the subscriber is already registered, and registers the information of the subscriber of new registration in the subscriber management information table when the subscriber is not registered, so that management of the new registration of the subscriber in each wireless base station can easily be realized in accordance with the SET request from the management center.

Furthermore, according to the present invention, there is provided a wireless access system in which a management center is provided with an SNMP manager, each wireless base station is provided with an SNMP agent and a subscriber management information table for storing subscriber information, and each wireless base station refers to the subscriber management information table to perform communication with a subscriber station permitted to communicate. The SNMP manager of the management center uses an SNMP protocol to transmit information of subscriber registration deletion to the SNMP agent of the wireless base station in accordance with an SNMP SET request, and the SNMP agent of the wireless base station checks whether or not a pertinent subscriber is registered in the subscriber management information table on judging that the SET request is subscriber registration deletion, returns an error to the SNMP manager of the management center when the subscriber is not registered, and deletes the subscriber information in the subscriber management information table when the subscriber is registered, so that management of the subscriber registration deletion in each wireless base station can easily be realized on the SET request from the management center.

Additionally, according to the present invention, there is provided a wireless access system in which a management center is provided with an SNMP manager, each wireless base station is provided with an SNMP agent and a subscriber management information table for storing subscriber information, and each wireless base station refers to the subscriber management information table to perform communication with a subscriber station permitted to communicate. The SNMP manager of the management center uses an SNMP protocol to transmit information of subscriber operation stop to the SNMP agent of the wireless base station in accordance with an SNMP SET request, and the SNMP agent of the wireless base station checks whether or not a pertinent subscriber is registered in the subscriber management information table on judging that the SET request is subscriber operation stop, returns an error to the SNMP manager of the management center when the subscriber is not registered, and sets the subscriber information in the subscriber management information table to the operation stop when the subscriber is registered, so that management of the subscriber operation stop in each wireless base station can easily be realized on the SET request from the management center.

According to the present invention, there is provided a wireless access system in which a management center is provided with an SNMP manager, each wireless base station is provided with an SNMP agent and a subscriber management information table for storing subscriber information, and each wireless base station refers to the subscriber management information table to perform communication with a subscriber station permitted to communicate. The SNMP manager of the management center uses an SNMP protocol to transmit information of subscriber operation restart to the SNMP agent of the wireless base station in accordance with an SNMP SET request, and the SNMP agent of the wireless base station checks the subscriber management information table on judging that the SET request is subscriber operation restart, returns an error to the SNMP manager of the management center when the subscriber is not registered and when the subscriber is registered but operation information fails to be stopped, and sets the subscriber information in the subscriber management information table to the operation restart when the subscriber is registered and the operation information is stopped, so that management of the subscriber operation restart in each wireless base station can easily be realized on the SET request from the management center.

According to the present invention, there is provided a wireless access system in which a management center is provided with an SNMP manager, each wireless base station is provided with an SNMP agent and a subscriber management information table for storing subscriber information, and each wireless base station refers to the subscriber management information table to perform communication with a subscriber station permitted to communicate. The SNMP manager of the management center uses an SNMP protocol to transmit, to the SNMP agent of the wireless base station, information of subscriber operation stop in a first specific time and information of subscriber operation restart in a second specific time in accordance with an SNMP SET request, and the SNMP agent of the wireless base station checks whether or not a pertinent subscriber is registered in the subscriber management information table on judging that the SET request received in the first specific time is subscriber operation stop, returns an error to the SNMP manager of the management center when the subscriber is not registered, and sets the subscriber information in the subscriber management information table to the operation stop when the subscriber is registered. The SNMP agent of the wireless base station checks the subscriber management information table on judging that the SET request received in the second specific time is subscriber operation restart, returns the error to the SNMP manager of the management center when the subscriber is not registered and when the subscriber is registered but operation information fails to be stopped, and sets the subscriber information in the subscriber management information table to the operation restart when the subscriber is registered and the operation information is stopped, so that management of the subscriber operation stop and operation restart in each wireless base station can be automated by timer set, and can easily be realized on the SET request from the management center.

Figure 1:
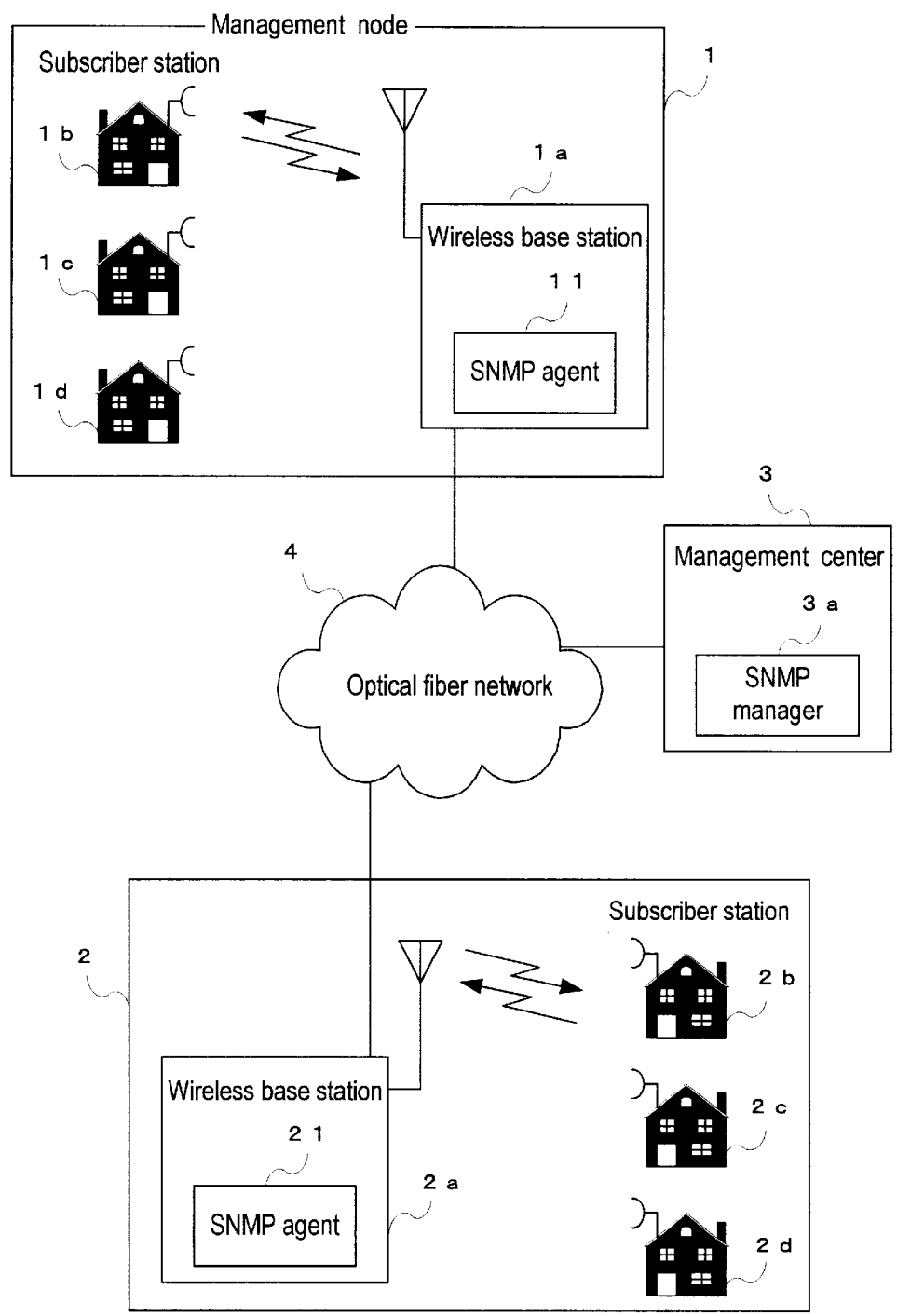
FIG. 1 is a constitution block diagram of a wireless access system according to an embodiment of the present invention.

DESCRIPTION OF REFERENCE NUMERALS 1, 2 . . . management node, 1a, 2a . . . wireless base station, 1b, 1c, 1d, 2b, 2c, 2d . . . subscriber station, 3 . . . management center, 3a . . . SNMP manager, 4 . . . optical fiber network, 11, 21 . . . SNMP agent, 12 . . . subscriber management information table, 13 . . . subscriber registration means, 14 . . . subscriber deletion means, 15 . . . subscriber service stop means, 16 . . . service stop notification means, 17 . . . subscriber service restart means, 18 . . . service restart notification means

DETAILED DESCRIPTION OF THE PREFERRED EMBODIMENTS

An embodiment of the present invention will be described with reference to the drawings.

In a wireless access system of the embodiment of the present invention, a management center is provided with an SNMP manager, each wireless base station is provided with an SNMP agent, an SNMP protocol is used to set information of subscriber new registration, registration deletion, operation stop, and operation restart in a subscriber management information table for use in communication permission in accordance with an SET request, and thereby subscriber management in each wireless base station can easily be realized on the SET request from the management center.

The wireless access system (the present system) according to the embodiment of the present invention will be described with reference to FIG. 1. FIG. 1 is a constitution block diagram of the wireless access system.

As shown in FIG. 1, the present system is constituted of management nodes 1, 2 provided with one wireless base station and a plurality of subscriber stations, a management center 3 for performing maintenance/monitor of the respective management nodes, and an optical fiber network 4 constituting a backbone network to connect the management nodes 1, 2 to the management center 3.

Next, respective parts of the present system will concretely be described.

The management node 1 is constituted of a wireless base station 1a and a plurality of subscriber stations 1b, 1c, 1d connected to the wireless base station via wireless.

The management node 2 is constituted of a wireless base station 2a and a plurality of subscriber stations 2b, 2c, 2d connected to the wireless base station via wireless.

In FIG. 1, only two management nodes are drawn, but in actual more management nodes exist, and a large number of subscriber stations are also present in each management node.

In the present embodiment, an P-MP method in the subscriber wireless access system is employed.

The optical fiber network 4 is shown as the backbone network, but general public networks such as ISDN may be used.

The wireless base station in the wireless access system of the P-MP method confirms whether a destination address or a transmitter address of a received packet corresponds to the subscriber station registered in the wireless base station, when data is received from the optical fiber network 4, or when the data is received from the subscriber station.

This is performed to inhibit an unnecessary packet from being sent to a wireless section from the backbone network, and to prevent an illegal access from the subscriber station.

The management center 3 of a remote site is provided with a manager 3a of a simple network management protocol (SNMP) as a standard management protocol of Internet, and performs a subscriber management operation.

The wireless base stations 1a, 2a are provided with SNMP agents 11, 21, and accumulate management information for the subscriber to be managed as a management information base (MIB) of SNMP in a storage apparatus in the wireless base station.

A concrete processing of subscriber management information between the management center 3 and the wireless base station will be described hereinafter in detail.

Additionally, in appended claims, for a subscriber management information table, function realizing means for setting information of subscriber new registration is claimed as subscriber registration means, function realizing means for setting information of subscriber registration deletion is claimed as subscriber deletion means, function realizing means for setting information of subscriber operation stop is claimed as subscriber service stop means, function realizing means for notifying the subscriber station of service stop is claimed as service stop notification means, function realizing means for setting information of subscriber operation restart is claimed as subscriber service restart means, and function realizing means for notifying the subscriber station of service restart is claimed as service restart notification means.

Figure 6:
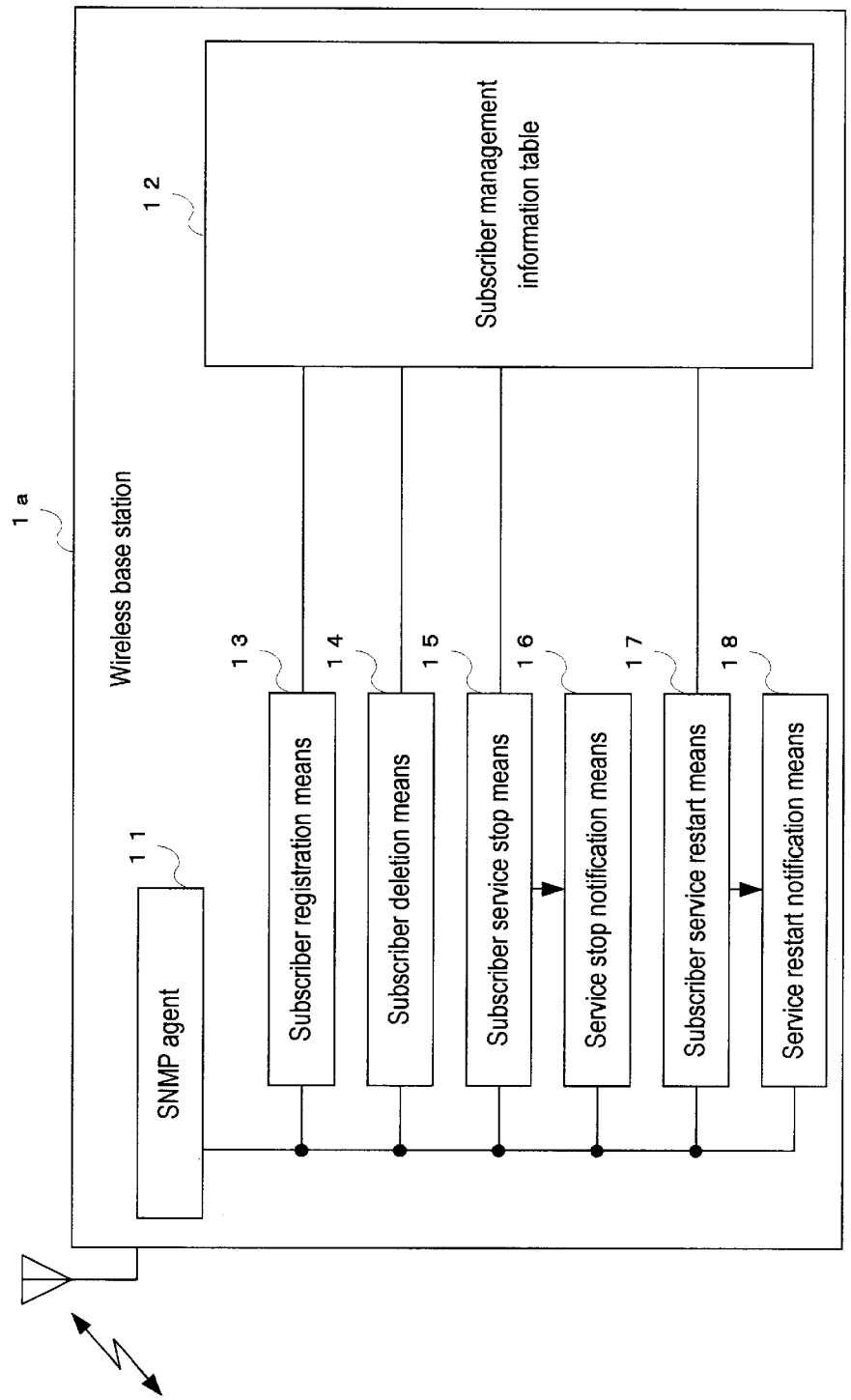
FIG. 6 is a constitution block diagram showing a constitution inside the wireless base station.

These respective means are shown in a constitution block diagram in the wireless base station of FIG. 6. FIG. 6 is a constitution block diagram showing a constitution inside the wireless base station.

As shown in FIG. 6, the wireless base station 1a is constituted of an SNMP agent 11, a subscriber management information table 12, subscriber registration means 13, subscriber deletion means 14, subscriber service stop means 15, service stop notification means 16, subscriber service restart means 17, and service restart notification means 18. Here, the respective means are realized by software in the wireless base station 1a.

Operations of the respective means will be described.

The SNMP agent 11 receives a signal from the SNMP manager 3a, controls the operations of the respective means in accordance with a signal content, further inputs the signal from each means, and transmits the signal to the SNMP manager 3a.

The subscriber management information table 12 is a table for managing the subscriber information in the management node as described later.

The subscriber registration means 13 is means for setting the information of subscriber new registration in the subscriber management information table 12 when the SNMP manager 3a of the management center 3 uses the SNMP protocol to transmit the subscriber new registration information to the SNMP agent 11 of the wireless base station 1a.

The subscriber deletion means 14 is means for setting the information of subscriber registration deletion in the subscriber management information table 12 when the SNMP manager 3a of the management center 3 uses the SNMP protocol to transmit the subscriber registration deletion information to the SNMP agent 11 of the wireless base station 1a.

The subscriber service stop means 15 is means for setting the information of subscriber operation stop in the subscriber management information table 12 when the SNMP manager 3a of the management center 3 uses the SNMP protocol to transmit the subscriber operation stop information to the SNMP agent 11 of the wireless base station 1a.

The service stop notification means 16 is means for using a wireless signal to notify the subscriber station for the operation stop of the service stop during the subscriber operation stop.

The subscriber service restart means 17 is means for setting the subscriber operation restart information in the subscriber management information table 12 when the SNMP manager 3a of the management center 3 uses the SNMP protocol to transmit the subscriber operation restart information to the SNMP agent 11 of the wireless base station 1a.

The service restart notification means 18 is means for using the wireless signal to notify the subscriber station for the operation restart of service restart during the subscriber operation restart.

Additionally, the SNMP agent 11 has been described above as being separate from the respective means, but each means function may be included in the SNMP agent 11.

Figure 2:
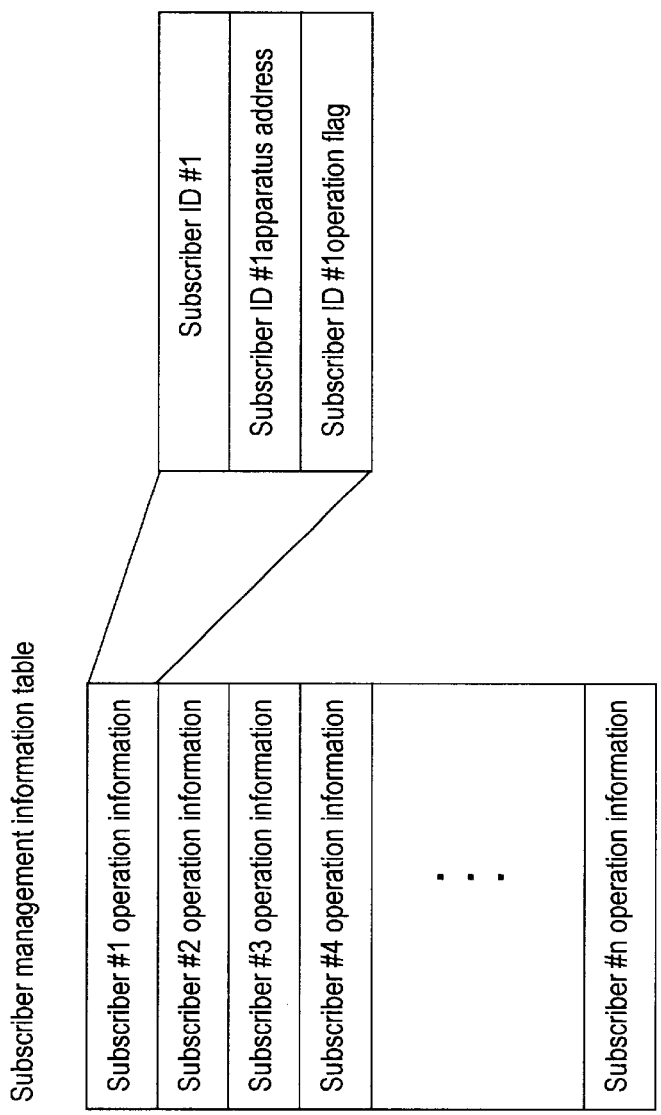
FIG. 2 is a diagram showing a subscriber management information table managed by a wireless base station.
Figure 3:
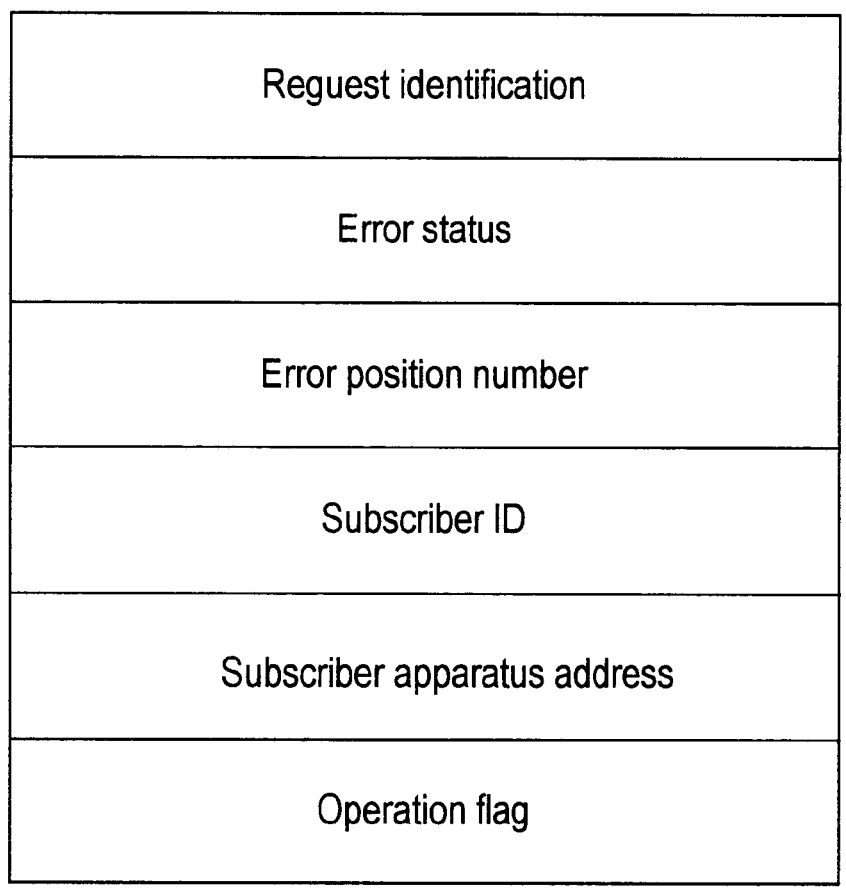
FIG. 3 is a diagram showing PDU of an SNMP set request.

First, for an example of registration of a new subscriber station, new registration of the subscriber station 1d as a subscriber station under the wireless base station 1a in the management node 1 will be described with reference to FIGS. 2 and 3. FIG. 2 is a diagram showing a subscriber management information table managed in the wireless base station, and FIG. 3 is a diagram showing PDU of an SNMP set request.

In the storage apparatus disposed in the wireless base station 1a, as shown in FIG. 2, subscriber management information is stored in a table form. After a communication agency makes a new contract with a subscriber as the subscriber station 1d, it is necessary to register the management information of the pertinent subscriber in the subscriber management information table of FIG. 2.

In this case, when the subscriber station is newly installed in each management node, the SNMP manager 3a installed in the management center 3 of FIG. 1 uses the SNMP protocol to perform a registration operation of the subscriber information in the wireless base station of the management node.

Moreover, the SNMP agent 11 is mounted on the wireless base station 1a of the management node 1, an SNMP MIB table is accumulated in the storage apparatus in the wireless base station, and the MIB table includes the subscriber management information table of FIG. 2.

The management information registration of the subscriber station 1d is performed by SNMP SET request of the SNMP manager 3a of the management center 3 after the subscriber contract between the communication agency and the subscriber station 1d.

As shown in FIG. 3, the SET request is constituted of a protocol data unit (PDU) provided with apparatus addresses such as MAC address of the subscriber station 1d, subscriber ID for managing the subscriber, and an operation flag indicating registration.

Figure 7:
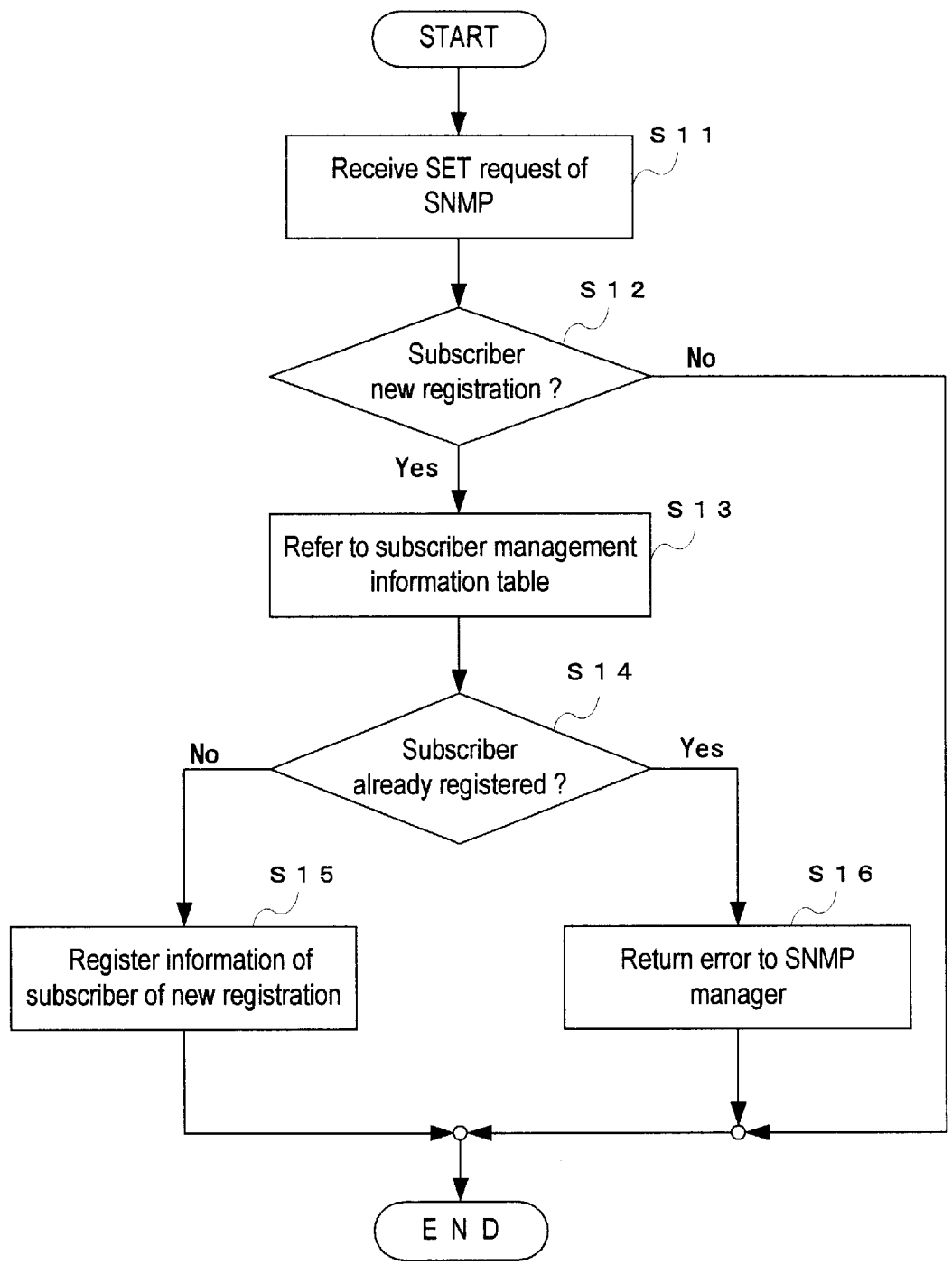
FIG. 7 is a flowchart showing a new registration processing.

A processing in the wireless base station 1a will next be described with reference to FIG. 7. FIG. 7 is a flowchart showing a new registration processing.

On receiving the SET request indicating a registration request of the subscriber station 1d from the optical fiber network 4 as the backbone network (S11), the SNMP agent 11 of the wireless base station 1a judges that the SET request is a subscriber registration command because the operation flag in the received PDU indicates the registration of new subscription. Specifically, it is judged whether or not there is a subscriber new registration (S12). With the new registration (Yes), the processing advances to the following processing, and if not (No), the processing ends.

Subsequently, the wireless base station 1a refers to the subscriber management information table (S13), checks whether the subscriber ID and apparatus address in the received PDU already exist in the subscriber management information table of FIG. 2 (S14), adds the received subscriber ID and apparatus address to an empty record of the subscriber management information table (S15) when they fail to exist (No), and returns a response of error to the SNMP manager 3a of the management center 3 (S16) when they already exist (Yes).

After end of the registration of the subscriber station 1d into the wireless base station 1a, even if communication with the subscriber station 1d actually occurs, the communication of the subscriber station 1d is permitted in the wireless base station 1a because the transmitter address or the destination address of the packet received by the wireless base station 1a exists in the subscriber management information table.

Moreover, the subscriber ID of the subscriber station 1d registered in this procedure can be utilized as an index of security and maintenance.

Subsequently, for service cancellation of the subscriber station with the communication agency, in the management node 1, an example will be described in which the subscriber station 1d cancels management registration of the wireless base station 1a.

Similarly as the new registration of the subscriber station, registration cancellation of the subscriber station is performed using the SNMP protocol from the management center 3 of the remote site.

Concretely, the SNMP manager 3a of the management center 3 transmits the SNMP set request indicating a request for deletion of the registration of the subscriber station 1d to the SNMP agent 11 of the wireless base station 1a.

The SNMP PDU transmitted from the SNMP manager 3a is constituted of the subscriber ID of the subscriber station 1d which performs the registration deletion, the apparatus address, and the operation flag indicating the registration deletion of the subscriber station by the transmitted SET request.

Figure 8:
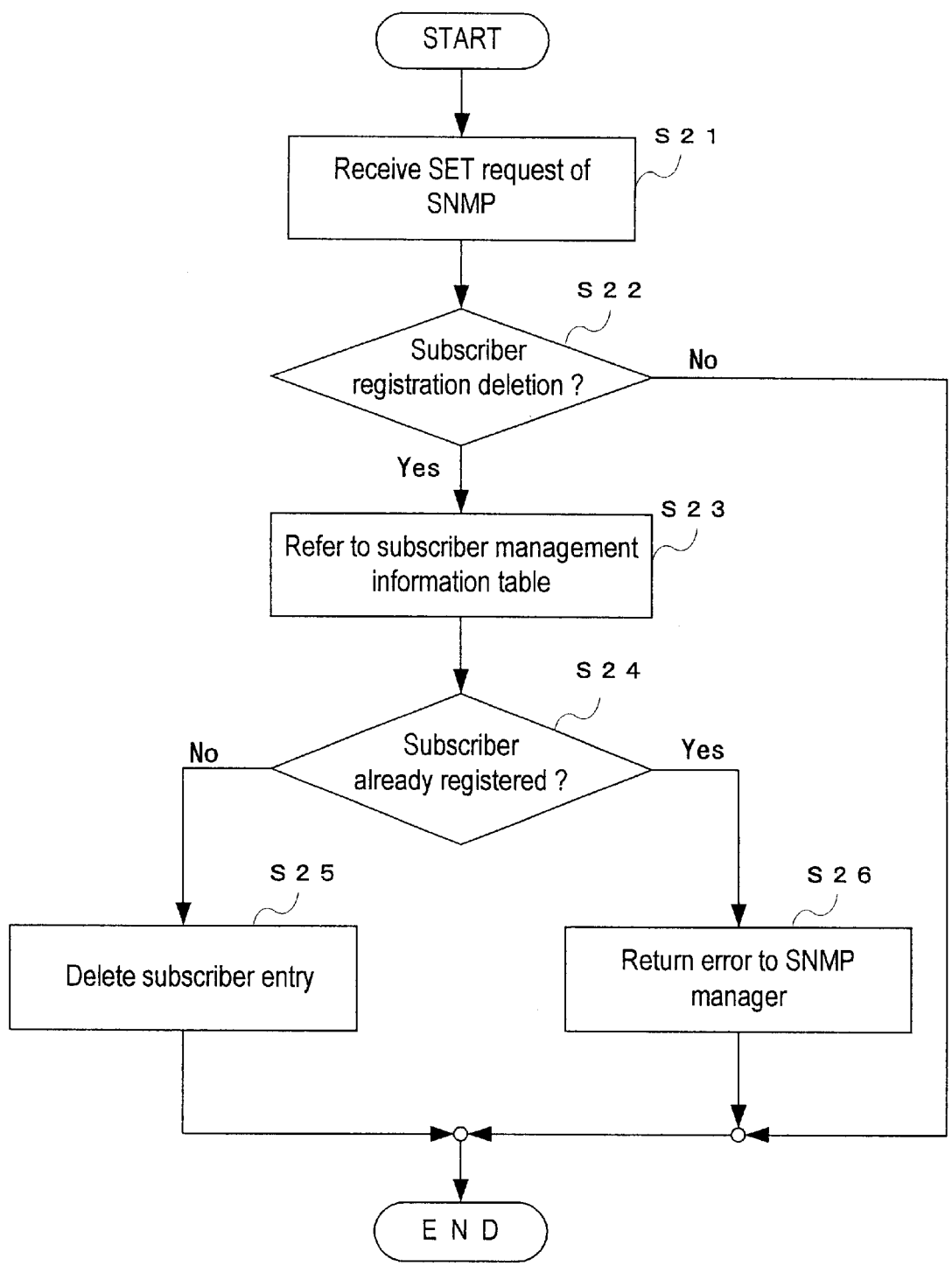
FIG. 8 is a flowchart showing a registration deletion processing.

A processing in the wireless base station 1a will next be described with reference to FIG. 8. FIG. 8 is a flowchart showing a registration deletion processing.

Subsequently, on receiving the SET request (S21), the wireless base station 1a judges that the SET request is a subscriber registration deletion command because the operation flag of the PDU of the received SET request indicates the registration deletion of the subscriber. Specifically, it is judged whether or not there is a subscriber registration deletion (S22). With the registration deletion (Yes), the processing advances to the following processing, and if not (No), the processing ends.

Subsequently, the wireless base station 1a refers to the subscriber management information table (S23), checks whether either the subscriber ID or the apparatus address of the received SET request already exists in the subscriber management information table 12 (S24), and deletes an entry of the subscriber station 1d of the subscriber management information table of FIG. 2 (S25) when it exists (Yes). Moreover, when the subscriber ID or the apparatus address fails to exist in the subscriber management information table 12 (No), the wireless base station returns the response of error to the SNMP manager 3a of the management center 3 (S26).

After the deletion of the registration of the subscriber station 1d into the wireless base station 1a, even if the communication between the wireless base station 1a and the subscriber station 1d actually occurs, the communication of the wireless base station 1a with the subscriber station 1d is rejected because the transmitter address or the destination address of the packet received by the wireless base station 1a fails to exist in the subscriber management information table.

Moreover, the present system can provide the service presenting communication agency with an operation mode in which the service is stopped in a given period or the stopped service is restarted for each subscriber. The subscriber service stop is a service necessary for the communication agency because there is a forced service stop caused by subscriber's fee nonpayment, or because there is a service stop for the given period requested by a subscriber side for subscriber's long absence or another reason.

For a case in which the subscriber stops the service of the communication agency for the given period, an example will be described in which the subscriber station 1d of the management node 1 sets the management registration of the wireless base station 1a to the operation stop.

Similarly as the new registration/deletion of the subscriber station, the operation of the subscriber station is performed using the SNMP protocol from the management center 3 of the remote site.

Concretely, the SNMP manager 3a of the management center 3 transmits the SNMP set request indicating the operation stop of the subscriber station 1d to the SNMP agent 11 of the wireless base station 1a.

The SNMP PDU transmitted from the SNMP manager 3a is constituted of the subscriber ID of the subscriber station 1d which performs the operation stop, the apparatus address of the subscriber station 1d, and the operation flag indicating the operation stop of the subscriber station by the transmitted SET request.

Figure 9:
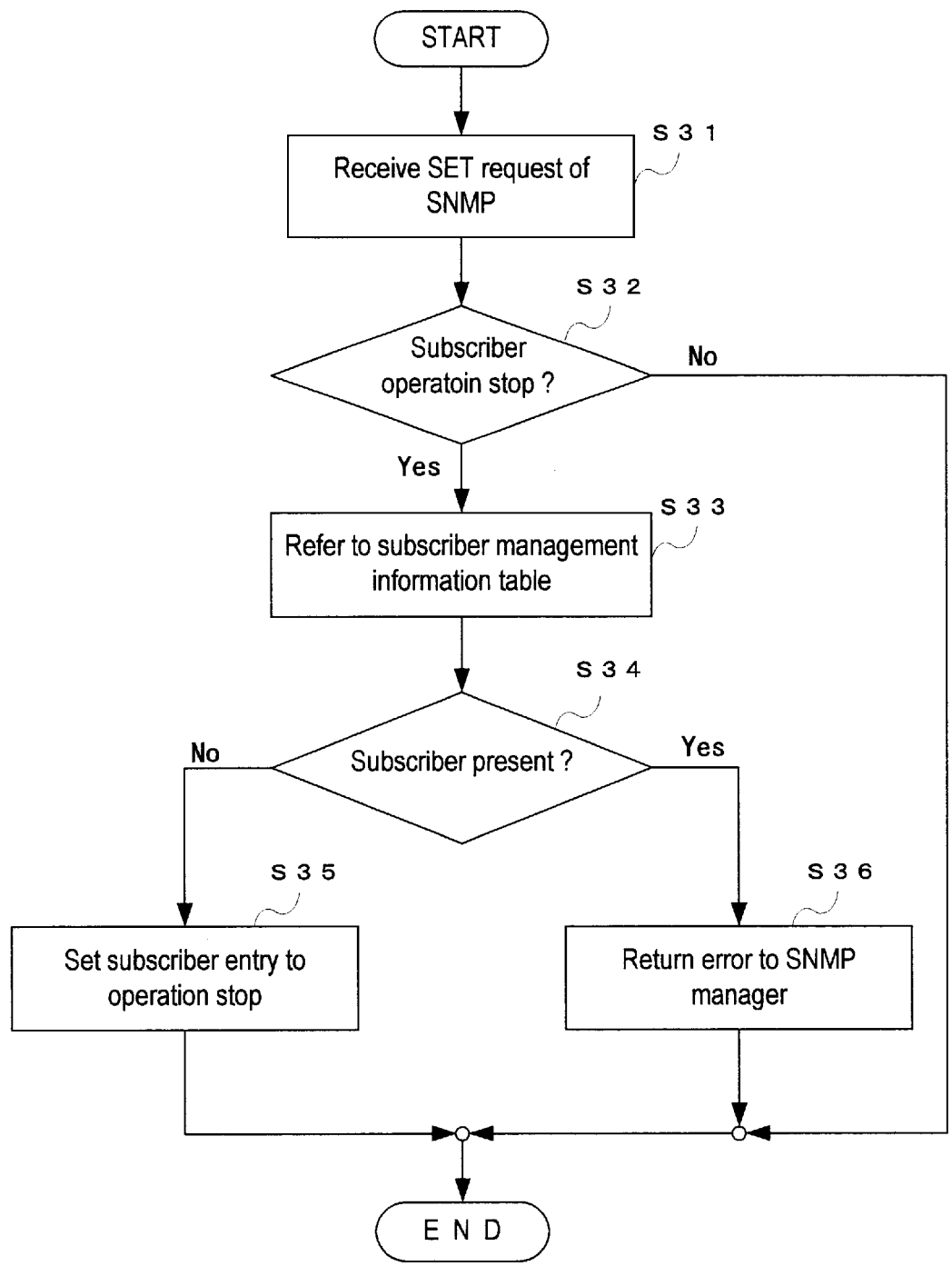
FIG. 9 is a flowchart showing an operation stop processing.

A processing in the wireless base station 1a will next be described with reference to FIG. 9. FIG. 9 is a flowchart showing an operation stop processing.

On receiving the SET request (S31), the wireless base station 1a judges that the SET request is a subscriber operation stop command because the PDU operation flag included in the received SET request indicates the subscriber operation stop. Specifically, it is judged whether or not there is a subscriber operation stop (S32). With the operation stop (Yes), the processing advances to the following processing, and if not (No), the processing ends.

Subsequently, the wireless base station 1a refers to the subscriber management information table (S33), checks whether either the received subscriber ID or the apparatus address exists in the subscriber management information table 12 (S34), and sets the operation flag on the entry of the subscriber station 1d of the subscriber management information table 12 to the stop (S35) when it exists (Yes). Moreover, when the subscriber ID or the apparatus address fails to exist in the subscriber management information table (No), the wireless base station returns the response of error to the SNMP manager 3a of the management center 3 (S36).

After the operation stop of the subscriber station 1d to the wireless base station, even if the communication with the subscriber station 1d actually occurs, or the transmitter address or the destination address of the packet received by the wireless base station 1a exists in the subscriber management information table 12, the communication between the wireless base station 1a and the subscriber station 1d is rejected by the wireless base station 1a because the subscriber operation flag indicates the operation stop.

Figure 4:
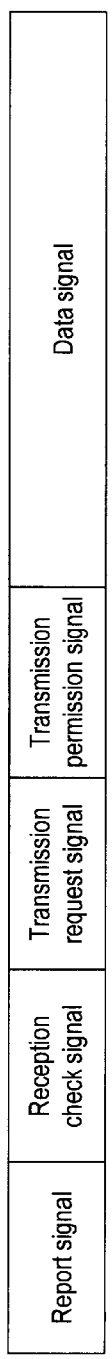
FIG. 4 is a diagram showing a wireless frame of the wireless access system.

Additionally, in the subscriber wireless access system of the P-MP method, a time division multiple access (TDMA) method is generally used, and the communication between one wireless base station and the subscriber station is performed in accordance with a predetermined frame signal. An example of a wireless frame used in the subscriber wireless access system is shown in FIG. 4. FIG. 4 is a diagram showing the wireless frame of the wireless access system.

The wireless frame is, as shown in FIG. 4, constituted of a report signal, a reception check signal, a transmission request signal, a transmission permission signal, and a data signal.

The report signal indicates a control channel transmitted to the subscriber station from the wireless base station at a given interval so as to secure synchronization between the wireless base station and the subscriber station.

The reception check signal indicates a control channel for returning ACK/NAK to the data signal.

The transmission request signal indicates a control channel for making a transmission start request to the wireless base station when one subscriber station performs data transmission to a wireless section.

The transmission permission signal indicates a control channel in which the wireless base station gives transmission permission to the transmission request signal.

The data signal indicates a channel for actually transmitting data.

Figure 5:
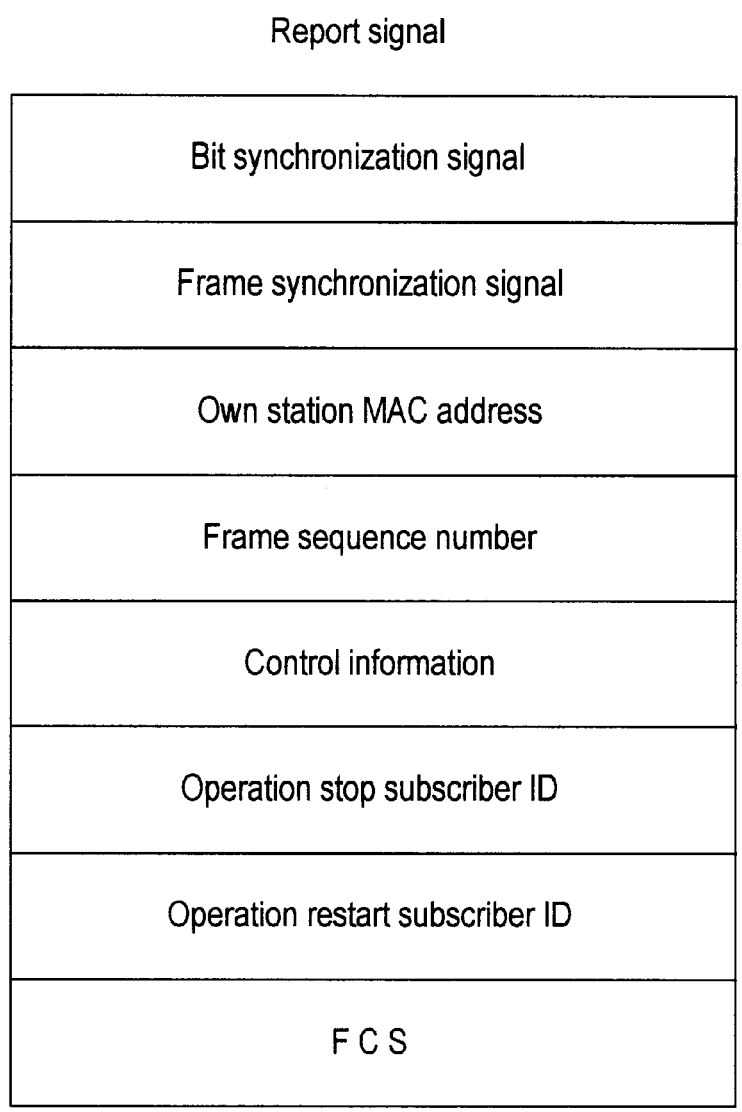
FIG. 5 is a diagram showing a content of a report signal.

When the operation stop processing of the subscriber station 1d is performed as described above, the wireless base station 1a adds the subscriber ID of the subscriber station 1d to a field of operation stop subscriber ID of the report signal shown in FIG. 5. FIG. 5 is a diagram showing a content of the report signal.

The report signal is transmitted from the wireless base station 1a at the given interval in order to obtain communication synchronization between the wireless base station 1a and the subscriber stations 1b to 1d. When the subscriber station 1d judges during report signal reception that the own station subscriber ID is added to the field of operation stop subscriber ID in the report signal, the communication with the wireless base station 1a other than a report signal reception processing is stopped, and a terminal connected to the subscriber station 1d is notified of service stop.

If the addition of the subscriber station ID to the field of the operation stop subscriber ID of the report signal is continuously performed for about several seconds, reception is securely performed by the subscriber station.

Subsequently, for a case in which the subscriber station restarts the operation service with the communication agency from a service stop state, in the management node 1, an example will be described in which the subscriber station 1d sets the management registration of the wireless base station 1a to operation restart.

Similarly as subscriber station new registration/deletion, the subscriber station operation restart is performed using the SNMP protocol from the management center 3 of the remote site.

Concretely, the SNMP manager 3a of the management center 3 transmits the SNMP set request indicating the operation restart of the subscriber station 1d to the SNMP agent 11 of the wireless base station 1a.

The SNMP PDU transmitted from the SNMP manager 3a is constituted of the subscriber ID of the subscriber station 1d which performs the operation restart, the apparatus address of the subscriber station 1d, and the operation flag in which the transmitted SET request indicates the operation restart of the subscriber station.

Figure 10:
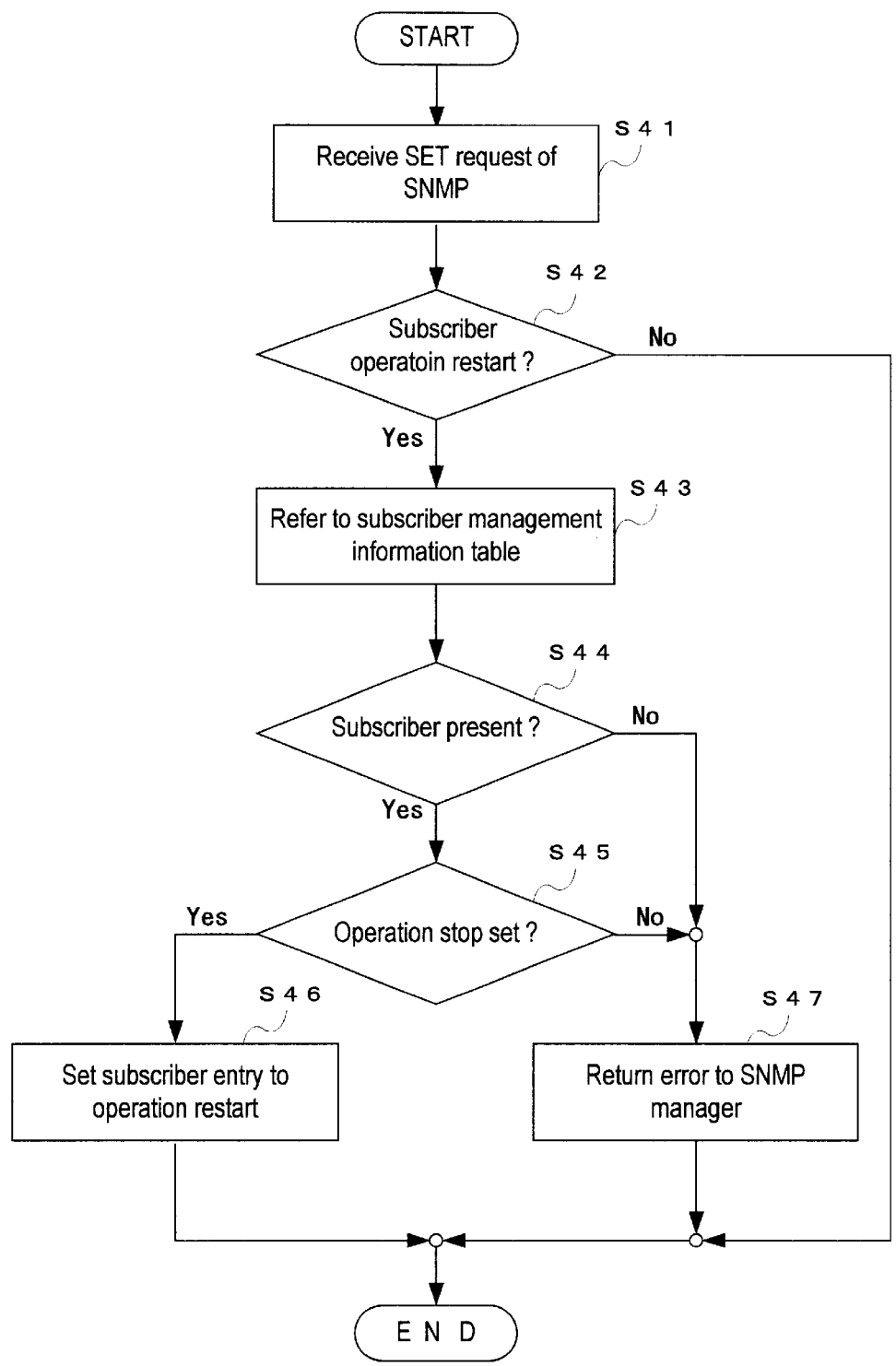
FIG. 10 is a flowchart showing an operation restart processing.

A processing in the wireless base station 1a will next be described with reference to FIG. 10. FIG. 10 is a flowchart showing an operation restart processing.

On receiving the SET request (S41), the wireless base station 1a judges that the SET request is a subscriber operation restart command because the PDU operation flag included in the received SET request indicates the subscriber operation restart. Specifically, it is judged whether or not there is a subscriber operation restart (S42). With the operation restart (Yes), the processing advances to the following processing, and if not (No), the processing ends.

Subsequently, the wireless base station 1a refers to the subscriber management information table (S43), checks whether either the received subscriber ID or the apparatus address already exists in the subscriber management information table 12 (S44), judges whether the operation flag of the subscriber management information table of the subscriber station 1d is set to the operation stop (S45) when it exists (Yes), and sets the operation flag on the entry of the subscriber station 1d of the subscriber management information table to the restart (S46) when the operation stop is set (Yes). Moreover, when the subscriber ID or the apparatus address fails to exist in the subscriber management information table (No in the step S44), or when the operation flag of the subscriber management information table of the subscriber station 1d is other than the operation stop (No in the step S45), the response of error is returned to the SNMP manager 3a of the management center 3 (S47).

After the operation restart of the subscriber station 1d to the wireless base station, when the communication with the subscriber station 1d actually occurs, the communication between the wireless base station 1a and the subscriber station 1d is permitted by the wireless base station 1a because the transmitter address or the destination address of the packet received by the wireless base station 1a exists in the subscriber management information table 12 and the subscriber operation flag indicates the operation restart.

When the operation restart processing of the subscriber station 1d is performed as described above, the wireless base station 1a adds the subscriber ID of the subscriber station 1d to a field of operation restart subscriber ID of the report signal shown in FIG. 5.

As described above, the report signal is transmitted from the wireless base station 1a at the given interval in order to obtain the communication synchronization between the wireless base station 1a and the subscriber stations 1b to 1d. When the subscriber station 1d judges during report signal reception that the own station subscriber ID is added to the field of operation restart subscriber ID in the report signal, the normal operation with the wireless base station 1a is restarted, and the terminal to be connected to the subscriber station 1d is notified of service restart.

If the addition of the subscriber station ID to the field of the operation restart subscriber ID of the report signal is continuously performed for about several seconds, the reception is securely performed by the subscriber station.

According to the present system, subscriber management operations performed by the communication agency, such as the subscriber new registration, deletion, service stop, and service restart can easily be performed from the management center of the remote site. Even if the number of nodes managed by the communication agency increases with an increase of the wireless base station, concentrated management of all the subscribers scattered for each wireless base station can effectively be realized easily.

Moreover, according to the present system, since the service stop or restart for each subscriber can be set from the management center 3, handling can effectively be performed flexibly for convenience of a subscriber side.

For example, by combining the service stop with the restart, and setting a timer beforehand in the SNMP manager 3a of the management center 3, it is possible to perform the service stop at a specific date/time, and to automatically perform the service start at another date/time.

Figure 11:
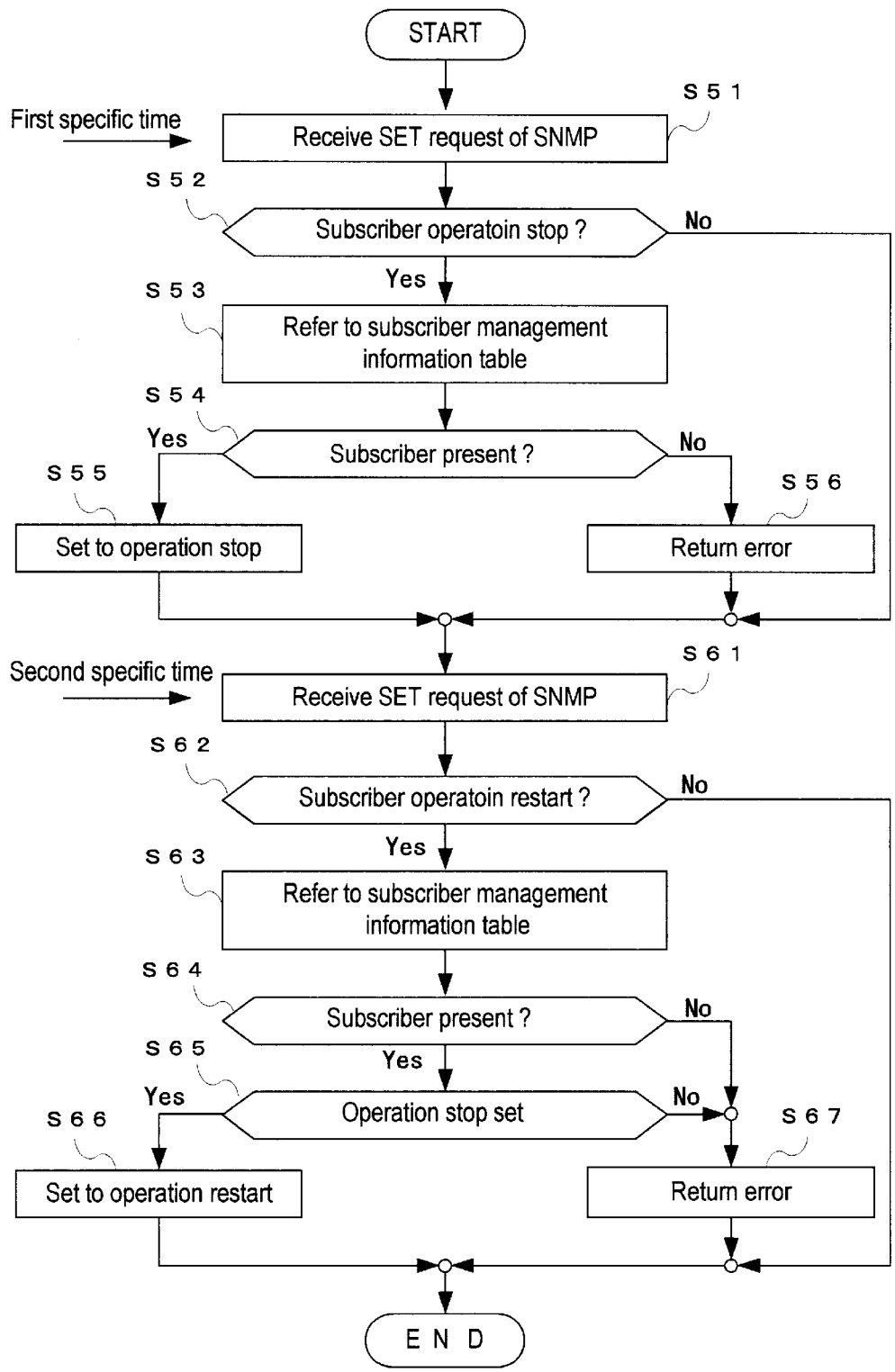
FIG. 11 is a flowchart showing a service stop and restart processing in which timer set is used.

A processing will be described with reference to FIG. 11 in which the service stop and restart are combined and performed using timer set. FIG. 11 is a flowchart showing a service stop and restart processing in which the timer set is used.

First, the SNMP manager 3a of the management center 3 transmits the SET request indicating the subscriber operation stop in a first specific time (date/time at which the subscriber operation is stopped), and transmits the SET request indicating the subscriber operation restart at a second specific time (date/time at which the subscriber operation is restarted).

On the other hand, the wireless base station 1a receives the SET request at the first specific time (S51), judges whether the PDU operation flag included in the received SET request indicates the subscriber operation stop (S52), and shifts to step S61 when the flag fails to indicate the operation stop (No).

When the flag indicates the operation stop in the step S52 (Yes), the wireless base station refers to the subscriber management information table (S53), judges whether the subscriber is present (S54), sets the information of the operation stop in the subscriber station of the subscriber management information table (S55) when the subscriber is present (Yes), and returns the error to the SNMP manager 3a when no subscriber is present (No).

After a while, the wireless base station 1a receives the SET request at the second specific time (S61), judges whether the PDU operation flag included in the received SET request indicates the subscriber operation restart (S62), and ends the processing when the flag fails to indicate the operation restart (No).

When the flag indicates the operation restart in the step S62 (Yes), the wireless base station refers to the subscriber management information table (S63), judges whether the subscriber is present (S64), further judges whether the information of the operation stop is set in the subscriber station (S65) when the subscriber is present (Yes), sets the information of the operation restart in the subscriber station of the subscriber management information table (S66) when the operation stop is set (Yes), and returns the error to the SNMP manager 3a (S67) when no subscriber is present (No). Subsequently, the processing ends.

In this manner, between the first specific time and the second specific time, the service stop and restart processing can automatically be performed with respect to the specific subscriber.

Moreover, according to the present system, by realizing the service stop, wasteful access from the subscriber station can be prevented, and therefore, there is an effect that communication throughput can be prevented from being deteriorated.

Furthermore, according to the present system, since the subscriber new registration, deletion, service stop, and service restart can be executed from the management center 3 in real time, illegal access can also effectively be prevented.

According to the present invention, there is provided the wireless access system in which the management center is provided with the SNMP manager, each wireless base station is provided with the SNMP agent, and the SNMP protocol is used to set the information of the subscriber new registration, registration deletion, operation stop and operation restart in the subscriber management information table used in communication permission in accordance with the SET request, so that the management of the subscriber in each wireless base station can effectively easily be realized on the SET request from the management center.

What is claimed is:

1. A wireless access system comprising: a plurality of wireless base stations connected to a backbone network; a subscriber station connected to said wireless base station via a wireless circuit; and a management center for performing management of said network, said management center being provided with an SNMP manager, said each wireless base station being provided with an SNMP agent and a subscriber management information table for storing subscriber information, said each wireless base station referring to said subscriber management information table to perform communication with the subscriber station permitted to communicate, wherein the SNMP manager of said management center uses an SNMP protocol to transmit information of subscriber new registration to the SNMP agent of said wireless base station in accordance with an SNMP SET request, and the SNMP agent of said wireless base station checks whether or not a pertinent subscriber is registered in said subscriber management information table on judging that said SET request is the subscriber new registration, returns an error to the SNMP manager of said management center when the subscriber is already registered, and registers the information of the subscriber of the new registration in said subscriber management information table when the subscriber is not registered.

2. A wireless access system comprising: a plurality of wireless base stations connected to a backbone network; a subscriber station connected to said wireless base station via a wireless circuit; and a management center for performing management of said network, said management center being provided with an SNMP manager, said each wireless base station being provided with an SNMP agent and a subscriber management information table for storing subscriber information, said each wireless base station referring to said subscriber management information table to perform communication with the subscriber station permitted to communicate, wherein the SNMP manager of said management center uses an SNMP protocol to transmit information of subscriber registration deletion to the SNMP agent of said wireless base station in accordance with an SNMP SET request, and the SNMP agent of said wireless base station checks whether or not a pertinent subscriber is registered in said subscriber management information table on judging that said SET request is the subscriber registration deletion, returns an error to the SNMP manager of said management center when the subscriber is not registered, and deletes the subscriber information in said subscriber management information table when the subscriber is registered.

3. A wireless access system comprising: a plurality of wireless base stations connected to a backbone network; a subscriber station connected to said wireless base station via a wireless circuit; and a management center for performing management of said network, said management center being provided with an SNMP manager, said each wireless base station being provided with an SNMP agent and a subscriber management information table for storing subscriber information, said each wireless base station referring to said subscriber management information table to perform communication with the subscriber station permitted to communicate, wherein the SNMP manager of said management center uses an SNMP protocol to transmit information of subscriber operation stop to the SNMP agent of said wireless base station in accordance with an SNMP SET request, and the SNMP agent of said wireless base station checks whether or not a pertinent subscriber is registered in said subscriber management information table on judging that said SET request is the subscriber operation stop, returns an error to the SNMP manager of said management center when the subscriber is not registered, and sets the subscriber information in said subscriber management information table to the operation stop when the subscriber is registered.

4. The wireless access system according to claim 3 wherein the wireless base station notifies the subscriber station of the operation stop on setting the information of the subscriber operation stop, and said subscriber station notifies a connected terminal of the operation stop.

5. The wireless access system according to claim 4 wherein the wireless base station continuously notifies the subscriber station of the operation stop.

6. A wireless access system comprising: a plurality of wireless base stations connected to a backbone network; a subscriber station connected to said wireless base station via a wireless circuit; and a management center for performing management of said network, said management center being provided with an SNMP manager, said each wireless base station being provided with an SNMP agent and a subscriber management information table for storing subscriber information, said each wireless base station referring to said subscriber management information table to perform communication with the subscriber station permitted to communicate, wherein the SNMP manager of said management center uses an SNMP protocol to transmit information of subscriber operation restart to the SNMP agent of said wireless base station in accordance with an SNMP SET request, and the SNMP agent of said wireless base station checks said subscriber management information table on judging that said SET request is the subscriber operation restart, returns an error to the SNMP manager of said management center when the subscriber is not registered and when the subscriber is registered but operation information fails to be stopped, and sets the subscriber information in said subscriber management information table to the operation restart when the subscriber is registered and the operation information is stopped.

7. The wireless access system according to claim 6 wherein the wireless base station notifies the subscriber station of the operation restart on setting the information of the subscriber operation restart, and said subscriber station notifies a connected terminal of the operation restart.

8. The wireless access system according to claim 7 wherein the wireless base station continuously notifies the subscriber station of the operation restart.

9. A wireless access system comprising: a plurality of wireless base stations connected to a backbone network; a subscriber station connected to said wireless base station via a wireless circuit; and a management center for performing management of said network, said management center being provided with an SNMP manager, said each wireless base station being provided with an SNMP agent and a subscriber management information table for storing subscriber information, said each wireless base station referring to said subscriber management information table to perform communication with the subscriber station permitted to communicate, wherein the SNMP manager of said management center uses an SNMP protocol to transmit, to the SNMP agent of said wireless base station, information of subscriber operation stop at a first specific time and information of subscriber operation restart at a second specific time in accordance with an SNMP SET request, and the SNMP agent of said wireless base station checks whether or not a pertinent subscriber is registered in said subscriber management information table on judging that the SET request received at said first specific time is the subscriber operation stop, returns an error to the SNMP manager of said management center when the subscriber is not registered, and sets the subscriber information in said subscriber management information table to the operation stop when the subscriber is registered, and the SNMP agent of said wireless base station checks said subscriber management information table on judging that the SET request received at said second specific time is the subscriber operation restart, returns the error to the SNMP manager of said management center when the subscriber is not registered and when the subscriber is registered but operation information fails to be stopped, and sets the subscriber information in said subscriber management information table to the operation restart when the subscriber is registered and the operation information is stopped.

10. A wireless access system comprising: a plurality of wireless base stations connected to a backbone network; a subscriber station connected to said wireless base station via a wireless circuit; and a management center for performing management of said network, said management center being provided with an SNMP manager, said each wireless base station being provided with an SNMP agent and a subscriber management information table for storing subscriber information, said each wireless base station referring to said subscriber management information table to perform communication with the subscriber station permitted to communicate, said wireless access system further comprising:

subscriber registration means for setting subscriber new registration in said subscriber management information table when the SNMP manager of said management center uses an SNMP protocol to transmit information of the subscriber new registration to the SNMP agent of said wireless base station;

subscriber deletion means for setting subscriber registration deletion in said subscriber management information table when the SNMP manager of said management center uses an SNMP protocol to transmit information of the subscriber registration deletion to the SNMP agent of said wireless base station;

subscriber service stop means for setting subscriber operation stop in said subscriber management information table when the SNMP manager of said management center uses an SNMP protocol to transmit information of the subscriber operation stop to the SNMP agent of said wireless base station;

service stop notification means for using a wireless signal to notify the subscriber station for the operation stop of service stop during said subscriber operation stop;

subscriber service restart means for setting subscriber operation restart in said subscriber management information table when the SNMP manager of said management center uses an SNMP protocol to transmit information of the subscriber operation restart to the SNMP agent of said wireless base station; and service restart notification means for using the wireless signal to notify the subscriber station for the operation restart of service restart during said subscriber operation restart.

* * * * *